(12) United States Patent
Hirokami

(10) Patent No.: US 10,988,493 B2
(45) Date of Patent: Apr. 27, 2021

(54) ORGANIC SILICON COMPOUND, AND ADDITIVE FOR RUBBER AND RUBBER COMPOSITION USING SAME

(71) Applicant: SHIN-ETSU CHEMICAL CO., LTD., Tokyo (JP)

(72) Inventor: Munenao Hirokami, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 239 days.

(21) Appl. No.: 16/303,448

(22) PCT Filed: Aug. 18, 2016

(86) PCT No.: PCT/JP2016/074072
§ 371 (c)(1),
(2) Date: Nov. 20, 2018

(87) PCT Pub. No.: WO2017/203728
PCT Pub. Date: Nov. 30, 2017

(65) Prior Publication Data
US 2020/0317701 A1    Oct. 8, 2020

(30) Foreign Application Priority Data
May 23, 2016  (JP) .............. JP2016-102385

(51) Int. Cl.
C07F 7/18       (2006.01)
C08C 19/25      (2006.01)
C08F 236/14     (2006.01)
C08K 5/548      (2006.01)
C08L 47/00      (2006.01)

(52) U.S. Cl.
CPC .......... *C07F 7/1876* (2013.01); *C07F 7/1804* (2013.01); *C08C 19/25* (2013.01); *C08F 236/14* (2013.01); *C08K 5/548* (2013.01); *C08L 47/00* (2013.01); *C08L 2205/03* (2013.01)

(58) Field of Classification Search
CPC ...... C07F 7/1876; C07F 7/1804; C08C 19/26; C08F 236/14; C08L 47/00; C08L 2205/03
USPC ....................................................... 524/262
See application file for complete search history.

(56) References Cited

U.S. PATENT DOCUMENTS

| | | | |
|---|---|---|---|
| 3,759,869 A * | 9/1973 | Skeist et al. ............ | C08L 23/16 524/404 |
| 3,842,111 A | 10/1974 | Meyer-Simon et al. | |
| 4,571,125 A | 2/1986 | Oshima et al. | |
| 5,159,009 A * | 10/1992 | Wolff ................ | C08K 9/06 106/287.1 |
| 6,015,920 A * | 1/2000 | Schilling ............ | C07F 7/1876 556/479 |
| 6,229,036 B1 | 5/2001 | Batz-Sohn et al. | |
| 6,414,061 B1 | 7/2002 | Cruse et al. | |
| 2003/0236424 A1 | 12/2003 | Yanagisawa et al. | |
| 2004/0132880 A1 | 7/2004 | Durel et al. | |
| 2004/0266968 A1 | 12/2004 | Korth et al. | |
| 2012/0149901 A1* | 6/2012 | Tsuchida ............... | C07F 7/0879 544/221 |
| 2013/0150511 A1 | 6/2013 | Hirokami | |

FOREIGN PATENT DOCUMENTS

| | | | | |
|---|---|---|---|---|
| EP | 1 013 710 A1 | 6/2000 | | |
| EP | 1013710 A1 * | 6/2000 | ............ | C08C 19/25 |
| JP | 51-020208 A | 2/1976 | | |
| JP | 62-265301 A | 11/1987 | | |
| JP | 2000-095785 A | 4/2000 | | |
| JP | 2001-131464 A | 5/2001 | | |
| JP | 2002-145890 A | 5/2002 | | |
| JP | 2004-018511 A | 1/2004 | | |
| JP | 2004-059599 A | 2/2004 | | |
| JP | 2004-525230 A | 8/2004 | | |

(Continued)

OTHER PUBLICATIONS

Taiwanese Office Action and Search Report for Taiwanese Application No. 105128792, dated Oct. 1, 2019.

(Continued)

*Primary Examiner* — Michael Bernshteyn
(74) *Attorney, Agent, or Firm* — Birch, Stewart, Kolasch & Birch, LLP

(57) ABSTRACT

Provided is an organic silicon compound represented by formula (1), which when added to a rubber composition, can improve the wet traction performance of a cured product of the rubber composition, and significantly reduce a hysteresis loss of the cured product, and provides a rubber composition that can be used to implement a desired tire having high fuel efficiency.

(1)

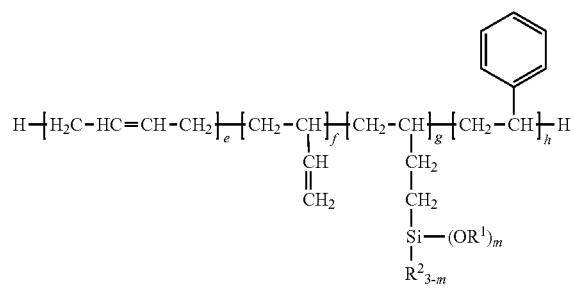

(In the formula, each $R^1$ independently represents an alkyl group having 1-10 carbon atoms or an aryl group having 6-10 carbon atoms, each $R^2$ independently represents an alkyl group having 1-10 carbon atoms or an aryl group having 6-10 carbon atoms, f represents a number equal to or larger than 0, e, g, and h each independently represent a number equal to or larger than 0, and m represents an integer of 1-3. Note that the repeating units can be present in any order.)

9 Claims, No Drawings

(56) References Cited

FOREIGN PATENT DOCUMENTS

| | | |
|---|---|---|
| JP | 2005-008639 A | 1/2005 |
| JP | 2005-350603 A | 12/2005 |
| JP | 2008-150546 A | 7/2008 |
| JP | 2010-132604 A | 6/2010 |
| JP | 2010-168528 A | 8/2010 |
| JP | 2012-121852 A | 6/2012 |
| JP | 2013-060376 A | 4/2013 |
| TW | 201339168 A | 10/2013 |
| WO | WO 2015/086039 A1 | 6/2015 |
| WO | WO-2015086029 A1 * | 6/2015 ............. A61L 27/38 |

OTHER PUBLICATIONS

Extended European Search Report dated Jan. 31, 2020, for European Application No. 16903207.5.
International Search Report (PCT/ISA/210) issued in PCT/JP2016/074072, dated Sep. 13, 2016.
Written Opinion (PCT/ISA/237) issued in PCT/JP2016/074072, dated Sep. 13, 2016.

* cited by examiner

ORGANIC SILICON COMPOUND, AND ADDITIVE FOR RUBBER AND RUBBER COMPOSITION USING SAME

TECHNICAL FIELD

The present invention relates to an organosilicon compound, and to a rubber compounding ingredient and a rubber composition which use the same. More particularly, the invention relates to an organosilicon compound having a polybutadiene skeleton and a polystyrene skeleton, to a method for preparing the same, to a rubber compounding ingredient and a rubber composition which use the organosilicon compound, and to a tire obtained from the rubber composition.

BACKGROUND ART

Sulfur-containing organosilicon compounds are useful as essential ingredients in the manufacture of tires made of silica-filled rubber compositions. Silica-filled tires have an excellent performance in automotive applications; in particular, the wear resistance, rolling resistance and wet grip are outstanding. Improvements in these performances are closely associated with increased tire fuel efficiency and so have been the subject of active research lately.

Increasing the silica loading of the rubber composition is essential for improving fuel efficiency. Silica-filled rubber compositions reduce the tire rolling resistance and improve the wet grip, but they have a high viscosity when unvulcanized and thus require multi-stage milling, which is a drawback in terms of the work efficiency during manufacture.

Therefore, in rubber compositions where an inorganic filler such as silica is merely blended in, dispersion of the filler is inadequate, leading to major decreases in fracture strength and wear resistance. Sulfur-containing organosilicon compounds have been essential for improving the dispersibility of inorganic fillers in rubber and also for inducing the filler to chemically bond with the rubber matrix (see Patent Document 1).

Compounds which include an alkoxysilyl group and a polysulfide silyl group in the molecule, such as bis(triethoxysilylpropyl)tetrasulfide and bis(triethoxysilylpropyl)disulfide, are known to be effective as sulfur-containing organosilicon compounds (see Patent Documents 2 to 5).

In addition to such organosilicon compounds having a polysulfide group, use of the following is also known: thioester-type organosilicon compounds containing a capped mercapto group, which are advantageous for dispersibility of the silica; and sulfur-containing organosilicon compounds of a type obtained by transesterification of an amino alcohol compound to a hydrolyzable silyl group moiety, which are advantageous for miscibility with silica due to hydrogen bonding (see Patent Documents 6 to 10).

Patent Documents 11 and 12 disclose silane-modified butadiene polymers, but these silane-modified butadiene polymers lack a polystyrene skeleton.

Also, Patent Document 13 discloses a rubber composition containing a silane-modified butadiene polymer. However, this is a butadiene polymer that is modified with urethane at both ends and thus has polar groups within the molecule. Hence, a rubber composition for tires that achieves the desired fuel efficiency is not obtained.

PRIOR ART DOCUMENTS

Patent Documents

Patent Document 1: JP-B S51-20208
Patent Document 2: JP-A 2000-525230
Patent Document 3: JP-A 2004-18511
Patent Document 4: JP-A 2002-145890
Patent Document 5: U.S. Pat. No. 6,229,036
Patent Document 6: JP-A 2005-8639
Patent Document 7: JP-A 2008-150546
Patent Document 8: JP-A 2010-132604
Patent Document 9: JP No. 4571125
Patent Document 10: U.S. Pat. No. 6,414,061
Patent Document 11: JP-A S62-265301
Patent Document 12: JP-A 2001-131464
Patent Document 13: JP-A 2005-350603

SUMMARY OF INVENTION

Technical Problem

It is therefore an object of this invention to provide an organosilicon compound which, when added to a rubber composition, is able to greatly lower the hysteresis loss of the cured composition and moreover enables fuel-efficient tires having the desired wet grip properties to be achieved.

Further objects of the invention are to provide a rubber compounding ingredient containing this organosilicon compound, a rubber composition formulated with this rubber compounding ingredient, and a tire formed using this rubber composition.

Solution to Problem

The inventors have conducted extensive investigations in order to achieve these objects. As a result, they have discovered that when a specific organosilicon compound having a polybutadiene skeleton and a polystyrene skeleton is added to a rubber composition, the hysteresis loss of the cured composition can be greatly decreased, making the compound suitable as a rubber compounding ingredient. The inventors have also found that tires obtained from rubber compositions containing this rubber compounding ingredient are able to achieve the wet grip properties and high fuel efficiency desired.

Accordingly, the invention provides:
1. An organosilicon compound having formula (1)

[Chem. 1]

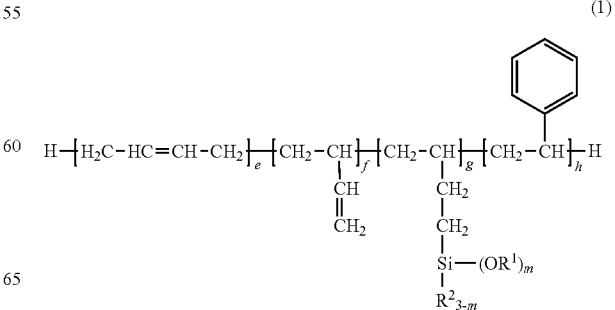

(wherein each $R^1$ is independently an alkyl group of 1 to 10 carbon atoms or an aryl group of 6 to 10 carbon atoms, each $R^2$ is independently an alkyl group of 1 to 10 carbon atoms or an aryl group of 6 to 10 carbon atoms, f is a number of 0 or more, e, g and h are each independently a number larger than 0, and m is an integer from 1 to 3, with the proviso that individual recurring units are arranged in any order);

2. A method for producing the organosilicon compound of 1 above, comprising the step of carrying out hydrosilylation between a butadiene-styrene copolymer of formula (2)

[Chem. 2]

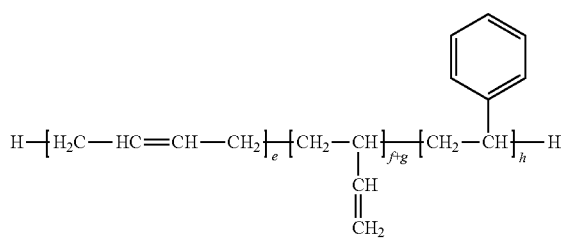

(2)

(wherein e, f, g and h are as defined above) and an organosilicon compound of formula (3)

[Chem. 3]

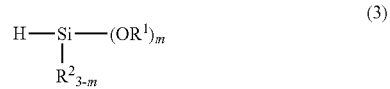

(3)

(wherein $R^1$, $R^2$ and m are as defined above) in the presence of a platinum compound-containing catalyst and an optional co-catalyst;

3. The organosilicon compound production method of 2 above, wherein the co-catalyst is an ammonium salt of an inorganic acid, an acid amide compound or a carboxylic acid;

4. The organosilicon compound production method of 3 above, wherein the ammonium salt of an inorganic acid is one or more selected from the group consisting of ammonium carbonate and ammonium bicarbonate;

5. The organosilicon compound production method of 3 above, wherein the acid amide compound is one or more selected from the group consisting of formamide, acetamide, N-methylacetamide, N,N-dimethylacetamide, propionamide, acrylamide, malonamide, succinamide, maleamide, fumaramide, benzamide, phthalamide, palmitamide and stearamide;

6. The organosilicon compound production method of 3 above, wherein the carboxylic acid is acetic acid;

7. A rubber compounding ingredient comprising the organosilicon compound of 1 above;

8. The rubber compounding ingredient of 7 above, further comprising a sulfide group-containing organosilicon compound;

9. The rubber compounding ingredient of 8 above which further comprises at least one type of powder, wherein the weight ratio of the combined amount (A) of the organosilicon compound and the sulfide group-containing organosilicon compound with respect to the powder content (B) satisfies the condition (A)/(B)=70/30 to 5/95;

10. A rubber composition comprising the rubber compounding ingredient of any of 7 to 9 above; and 11. A tire obtained by molding the rubber composition of 10 above.

Advantageous Effects of Invention

The organosilicon compound of the invention has a polybutadiene skeleton, a polystyrene skeleton and hydrolyzable silyl groups. Tires formed using a rubber composition that uses a rubber compounding ingredient containing this organosilicon compound are able to satisfy the desired wet grip properties and fuel-efficient tire properties.

DESCRIPTION OF EMBODIMENTS

The invention is described in detail below.
The organosilicon compound of the invention has formula (1) below. In formula (1), the individual recurring units are arranged in any order.

[Chem. 4]

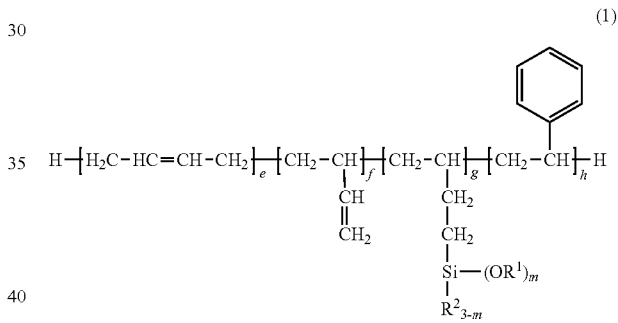

(1)

Here, each $R^1$ is independently an alkyl group of 1 to 10 carbon atoms or an aryl group of 6 to 10 carbon atoms, each $R^2$ is independently an alkyl group of 1 to 10 carbon atoms or an aryl group of 6 to 10 carbon atoms, f is a number of 0 or more, e, g and h are each independently a number larger than 0, and m is an integer from 1 to 3.

The alkyl group of 1 to 10 carbon atoms may be linear, cyclic or branched. Specific examples include methyl, ethyl, n-propyl, i-propyl, n-butyl, s-butyl, t-butyl, n-pentyl, n-hexyl, n-heptyl, n-octyl, n-nonyl, n-decyl, cyclopropyl, cyclobutyl, cyclopentyl, cyclohexyl, cycloheptyl and cyclooctyl groups.

Specific examples of the aryl group of 6 to 10 carbon atoms include phenyl, α-naphthyl and β-naphthyl groups.

$R^1$ is preferably a linear alkyl group, and more preferably a methyl or ethyl group.

$R^2$ is preferably a linear alkyl group, and more preferably a methyl or ethyl group.

The organosilicon compound of formula (1) can be obtained by, as shown in the scheme below, hydrosilylation between a butadiene-styrene copolymer of formula (2) and an organosilicon compound of formula (3) in the presence of a platinum compound-containing catalyst, preferably in the presence of a platinum compound-containing catalyst and a co-catalyst.

[Chem. 5]

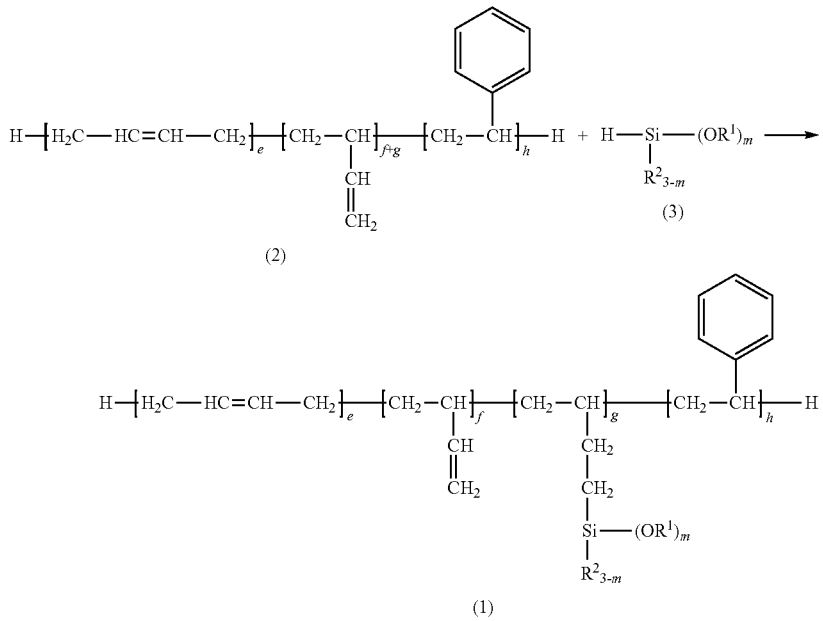

In the formulas, $R^1$, $R^2$, e, f, g, h and m are as defined above.

The butadiene-styrene copolymer of formula (2) may be synthesized by a known technique such as emulsion polymerization or solution polymerization using butadiene and styrene as the starting monomers, or may be acquired as a commercial product. For example, Ricon 100, Ricon 181 and Ricon 184 (all products of Cray Valley) are commercially available.

Examples of the organosilicon compound of formula (3) include trimethoxysilane, methyldimethoxysilane, dimethylmethoxysilane, triethoxysilane, methyldiethoxysilane and dimethylethoxysilane.

Platinum compound-containing catalysts that may be used in the hydrosilylation reaction are not particularly limited. Specific examples include chloroplatinic acid, alcohol solutions of chloroplatinic acid, toluene or xylene solutions of the platinum-1,3-divinyl-1,1,3,3-tetramethyldisiloxane complex, tetrakistriphenylphosphine platinum, dichlorobistriphenylphosphine platinum, dichlorobisacetonitrile platinum, dichlorobisbenzonitrile platinum, dichlorocyclooctadiene platinum, and supported catalysts such as platinum on carbon, platinum on alumina and platinum on silica.

From the standpoint of selectivity during hydrosilylation, a platinum(0) complex is preferred, and a toluene or xylene solution of the platinum-1,3-divinyl-1,1,3,3-tetramethyldisiloxane complex is more preferred.

The amount of platinum compound-containing catalyst used is not particularly limited. However, in terms of reactivity, productivity and the like, the amount is preferably such that the quantity of platinum atoms included per mole of the organosilicon compound of formula (3) is preferably from $1\times10^{-7}$ to $1\times10^{-2}$ mole, and more preferably from $1\times10^{-7}$ to $1\times10^{-3}$ mole.

It is preferable to use as a co-catalyst in the above reaction one or more selected from the group consisting of ammonium salts of inorganic acids, acid amide compounds and carboxylic acids.

Specific examples of ammonium salts of inorganic acids include ammonium chloride, ammonium sulfate, ammonium sulfamate, ammonium nitrate, ammonium dihydrogen phosphate, diammonium hydrogenphosphate, triammonium phosphate, ammonium hypophosphite, ammonium carbonate, ammonium bicarbonate, ammonium sulfate, ammonium borate and ammonium borofluoride. Of these, an ammonium salt of an inorganic acid having a pKa of at least 2 is preferred; ammonium carbonate and ammonium bicarbonate are more preferred.

Specific examples of acid amide compounds include formamide, acetamide, N-methylacetamide, N,N-dimethylacetamide, propionamide, acrylamide, malonamide, succinamide, maleamide, fumaramide, benzamide, phthalamide, palmitamide and stearamide.

Specific examples of carboxylic acids include formic acid, acetic acid, propionic acid, butyric acid, methoxyacetic acid, pentanoic acid, caproic acid, heptanoic acid, octanoic acid, lactic acid and glycolic acid. Of these, formic acid, acetic acid and lactic acid are preferred; acetic acid is more preferred.

The amount of co-catalyst used is not particularly limited. However, from the standpoint of reactivity, selectivity, cost and the like, the amount of co-catalyst used per mole of the organosilicon compound of formula (3) is preferably from $1\times10^{-5}$ to $1\times10^{-1}$ mole, and more preferably from $1\times10^{4}$ to $5\times10^{-1}$ mole.

The above reaction proceeds even in the absence of a solvent, although a solvent may be used.

Specific examples of solvents that may be used include hydrocarbon solvents such as pentane, hexane, cyclohexane, heptane, isooctane, benzene, toluene and xylene; ether solvents such as diethyl ether, tetrahydrofuran and dioxane; ester solvents such as ethyl acetate and butyl acetate; aprotic polar solvents such as N,N-dimethylformamide; and chlorinated hydrocarbon solvents such as dichloromethane and chloroform. These solvents may be used singly or two or more may be used in admixture.

The reaction temperature in the above hydrosilylation reaction is not particularly limited. The reaction may be carried out at from 0° C. up to under heating, although the temperature is preferably from 0 to 200° C.

Carrying out the reaction under heating is preferable for obtaining a suitable reaction rate. From this standpoint, the reaction temperature is more preferably from 40 to 110° C., and even more preferably from 40 to 90° C.

The reaction time also is not particularly limited, and is generally from about 1 hour to about 60 hours, preferably from 1 to 30 hours, and more preferably from 1 to 20 hours.

The rubber compounding ingredient of the invention is one that includes the above-described organosilicon compound of formula (1).

In this case, taking into account the viscosity, handleability and the like, the number-average molecular weight of the organosilicon compound used in the rubber compounding ingredient is preferably not more than 40,000.

The number-average molecular weight is a polystyrene equivalent value obtained by gel permeation chromatography.

In this invention, for such reasons as to enhance the properties of the resulting rubber composition, it is preferable that the hydrolyzable silyl group-containing units in the organosilicon compound used in the rubber compounding ingredient account for at least 2% of all units therein. Accordingly, the compound preferably satisfies, in formula (1), the condition $0.02 \leq g/(e+f+g+h) < 1.0$.

In particular, the hydrolyzable silyl group-containing units account for more preferably at least 3% of all the units.

The rubber compounding ingredient of the invention preferably includes a sulfide group-containing organosilicon compound.

Examples of the sulfide group-containing organosilicon compound include, without particular limitation, bis(trimethoxysilylpropyl)tetrasulfide, bis(triethoxysilylpropyl)tetrasulfide, bis(trimethoxysilylpropyl)disulfide and bis(triethoxysilylpropyl)disulfide.

The compounding ratio of the above organosilicon compound to the sulfide group-containing organosilicon compound in the rubber compounding ingredient (i.e., organosilicon compound: sulfide silane), expressed as a weight ratio, is preferably from 5:95 to 80:20, and more preferably from 10:90 to 50:50.

A mixture of the organosilicon compound of the invention and the sulfide group-containing organosilicon compound with at least one powder may be used as the rubber compounding ingredient.

Examples of the power include carbon black, talc, calcium carbonate, stearic acid, silica, aluminum hydroxide, alumina and magnesium hydroxide.

Of these, from the standpoint of the reinforcing properties, silica and aluminum hydroxide are preferred; silica is more preferred.

Taking into account the handleability of the rubber compounding ingredient, transport costs and the like, the amount of powder included is such that the weight ratio of the combined amount (A) of the organosilicon compound and the sulfide group-containing organosilicon compound to the total amount of powder (B), expressed as (A)/(B), is preferably from 70/30 to 5/95, and more preferably from 60/40 to 10/90.

The rubber compounding ingredient of the invention may be mixed with fatty acids, fatty acid salts, and organic polymers or rubbers such as polyethylene, polypropylene, polyoxyalkylene, polyester, polyurethane, polystyrene, polybutadiene, polyisoprene, natural rubber or styrene-butadiene copolymer, and may have included therein various types of additives commonly used for tires and other common rubber applications, such as vulcanizing agents, crosslinking agents, vulcanization accelerators, crosslinking accelerators, various oils, antidegradants, fillers and plasticizers.

The rubber compounding ingredient may be in the form of a liquid or a solid, and moreover may be in the form of a dilution in an organic solvent or in the form of an emulsion.

The rubber compounding ingredient of the invention may be suitably used as a compounding ingredient in filler-containing rubber compositions.

Examples of the filler include silica, talc, clay, aluminum hydroxide, magnesium hydroxide, calcium carbonate and titanium oxide. Of these, it is more preferable for the rubber compounding ingredient of the invention to be used as a compounding ingredient in a silica-containing rubber composition.

Here, taking into account, for example, the properties of the rubber obtained and the balance between the degree of the advantageous effects exhibited and the cost-effectiveness, the amount of rubber compounding ingredient added per 100 parts by weight of the filler included in the rubber composition, expressed as the combined amount of the organosilicon compound and the sulfide silane, is preferably from 0.2 to 30 parts by weight, and more preferably from 1 to 20 parts by weight.

The content of filler in the rubber composition may be set to an amount that is commonly included in the art, so long as this is consistent with the objects of the invention.

Also, in this invention, any rubber commonly used in various types of rubber compositions may be used as the rubber serving as the chief ingredient of the rubber composition to which the rubber compounding ingredient is added. Specific examples include natural rubber (NR); diene rubbers such as isoprene rubber (IR), various styrene-butadiene copolymer rubbers (SBR), various polybutadiene rubbers (BR) and acrylonitrile-butadiene copolymer rubber (NBR); and non-diene rubbers such as butyl rubber (IIR) and ethylene-propylene copolymer rubbers (EPR, EPDM). These may be used singly or two or more may be used in admixture.

The amount of rubber included in the rubber composition is not particularly limited, and may be within the ordinary range in the art of from 20 to 80 wt %.

In addition to the various above-described ingredients, various additives normally included for tire and other common rubber applications, such as carbon black, vulcanizers, crosslinking agents, vulcanization accelerators, crosslink accelerators, oils, antidegradants and plasticizers, may also be included in the rubber composition of the invention. These additives may be included in amounts that are commonly used in the art, so long as doing so is consistent with the objects of the invention.

The rubber composition obtained by including the rubber compounding ingredient of the invention may be kneaded by an ordinary method to form a composition, and the composition may then be used in the production of vulcanized or crosslinked rubber products such as tires. In the production of tires, it is especially preferable for the rubber composition of the invention to be used in tire treads.

Tires obtained using the rubber composition of the invention have a greatly reduced rolling resistance, in addition to which the wet grip properties and wear resistance are markedly improved, enabling the desired fuel efficiency to be achieved.

The construction of the tire may be a construction known to the art, and the method of production may be a method known to the art. When the tire is a pneumatic tire, ordinary air, air having a controlled oxygen partial pressure, or an inert gas such as nitrogen, argon or helium may be used as the gas that fills the interior of the tire.

EXAMPLES

The invention is illustrated more fully below by way of Working Examples and Comparative Examples, although the invention is not limited by these Examples.

All references to "parts" below stand for parts by weight. The molecular weight is the polystyrene-equivalent number-average molecular weight obtained by measurement using gel permeation chromatography (GPC). The viscosity is the value measured at 25° C. using a rotational viscometer.

[1] Production of Organosilane Compounds

Working Example 1-1

A one-liter separable flask equipped with a stirrer, a reflux condenser, a dropping funnel and a thermometer was charged with 100 g of Ricon 181 (from Cray Valley; number-average molecular weight, 7,100; in above formula (2), e=52, (f+g)=22 and h=29), 200 g of toluene, a toluene solution of platinum-1,3-divinyl-1,1,3,3-tetramethyldisiloxane complex (amount in terms of platinum atoms, $3.1 \times 10^{-3}$ mole), and 0.2 g ($3.1 \times 10^{-3}$ mole) of ammonium bicarbonate. Next, 51 g (0.31 mole) of triethoxysilane was added dropwise over 2 hours at an internal temperature of 75 to 85° C., following which the system was stirred at 80° C. for 1 hour. Results for percent conversion of triethoxysilane, as determined by gas chromatographic analysis, are shown in Table 1.

Following the completion of stirring, vacuum condensation and filtration were carried out, giving a clear brown liquid having a viscosity of 8,000 mPa·s and a number-average molecular weight of 10,500. The product, based on its molecular weight and the average structure as determined from the $^1$H-NMR spectrum, was an organosilicon compound of above formula (1) in which e=52, f=0, g=22 and h=29.

Working Example 1-2

Aside from changing the ammonium bicarbonate to 0.2 g ($1.5 \times 10^{-3}$ mole) of acetic acid, reaction and work-up were carried out in the same way as in Working Example 1-1, giving a clear brown liquid having a viscosity of 8,000 mPa·s and a number-average molecular weight of 10,500. The product, based on its molecular weight and the average structure as determined from the $^1$H-NMR spectrum, was an organosilicon compound of above formula (1) in which e=52, f=0, g=22 and h=29.

Results for percent conversion of triethoxysilane, as determined by gas chromatographic analysis, are shown in Table 1.

Working Example 1-3

Aside from changing the ammonium bicarbonate to 0.2 g ($1.5 \times 10^{-3}$ mole) of acetamide, reaction and work-up were carried out in the same way as in Working Example 1-1, giving a clear brown liquid having a viscosity of 8,000 mPa·s and a number-average molecular weight of 10,500. The product, based on its molecular weight and the average structure as determined from the $^1$H-NMR spectrum, was an organosilicon compound of above formula (1) in which e=52, f=0, g=22 and h=29.

Results for percent conversion of triethoxysilane, as determined by gas chromatographic analysis, are shown in Table 1.

Working Example 1-4

Aside from excluding ammonium bicarbonate, reaction and work-up were carried out in the same way as in Working Example 1-1, giving a clear brown liquid having a viscosity of 14,000 mPa·s and a number-average molecular weight of 7,100. The product, based on its molecular weight and the average structure as determined from the $^1$H-NMR spectrum, was an organosilicon compound of above formula (1) in which e=52, f=21.8, g=0.2 and h=29.

Results for percent conversion of triethoxysilane, as determined by gas chromatographic analysis, are shown in Table 1.

TABLE 1

| | Working Example | | | |
|---|---|---|---|---|
| | 1-1 | 1-2 | 1-3 | 1-4 |
| Co-catalyst | ammonium bicarbonate | acetic acid | acetamide | none |
| Conversion (%) | 98 | 98 | 98 | 1 |

As shown in Table 1, by using an ammonium salt of an inorganic acid, a carboxylic acid or an acid amide compound as the co-catalyst, the reaction proceeds more efficiently.

Working Example 1-5

A one-liter separable flask equipped with a stirrer, a reflux condenser, a dropping funnel and a thermometer was charged with 100 g of Ricon 181 (from Cray Valley; number-average molecular weight, 7,100; in above formula (2), e=52, (f+g)=22, h=29), 200 g of toluene, a toluene solution of platinum-1,3-divinyl-1,1,3,3-tetramethyldisiloxane complex (amount in terms of platinum atoms, $1.5 \times 10^{-3}$ mole), and 0.1 g ($1.5 \times 10^{-3}$ mole) of acetic acid. Next, 25 g (0.15 mole) of triethoxysilane was added dropwise over 2 hours at an internal temperature of 75 to 85° C., following which the system was stirred at 80° C. for 1 hour.

Following the completion of stirring, vacuum condensation and filtration were carried out, giving a clear brown liquid having a viscosity of 10,500 mPa·s and a number-average molecular weight of 8,800. The product, based on its molecular weight and the average structure as determined from the $^1$H-NMR spectrum, was an organosilicon compound of above formula (1) in which e=52, f=11, g=11 and h=29.

Working Example 1-6

A one-liter separable flask equipped with a stirrer, a reflux condenser, a dropping funnel and a thermometer was charged with 100 g of Ricon 181 (from Cray Valley; number-average molecular weight, 7,100; in above formula (2), e=52, (f+g)=22, h=29), 200 g of toluene, a toluene solution of platinum-1,3-divinyl-1,1,3,3-tetramethyldisiloxane complex (amount in terms of platinum atoms, $1.0 \times 10^{-3}$ mole), and 0.07 g of acetic acid ($1.0 \times 10^{-3}$ mole). Next, 17 g (0.10 mole) of triethoxysilane was added dropwise over 2 hours at an internal temperature of 75 to 85° C., following which the system was stirred at 80° C. for 1 hour.

Following the completion of stirring, vacuum condensation and filtration were carried out, giving a clear brown liquid having a viscosity of 11,500 mPa·s and a number-average molecular weight of 8,200. The product, based on its molecular weight and the average structure as determined from the $^1$H-NMR spectrum, was an organosilicon compound of above formula (1) in which e=52, f=15, g=7 and h=29.

Working Example 1-7

A one-liter separable flask equipped with a stirrer, a reflux condenser, a dropping funnel and a thermometer was charged with 100 g of Ricon 181 (from Cray Valley; number-average molecular weight, 7,100; in above formula (2), e=52, (f+g)=22, h=29), 200 g of toluene, a toluene solution of platinum-1,3-divinyl-1,1,3,3-tetramethyldisiloxane complex (amount in terms of platinum atoms, 0.5×10$^{-3}$ mole), and 0.04 g (0.5×10$^{-3}$ mole) of acetic acid. Next, 8 g (0.05 mole) of triethoxysilane was added dropwise over 2 hours at an internal temperature of 75 to 85° C., following which the system was stirred at 80° C. for 1 hour.

Following the completion of stirring, vacuum condensation and filtration were carried out, giving a clear brown liquid having a viscosity of 12,500 mPa·s and a number-average molecular weight of 7,500. The product, based on its molecular weight and the average structure as determined from the $^1$H-NMR spectrum, was an organosilicon compound of above formula (1) in which e=52, f=19, g=3 and h=29.

Working Example 1-8

A one-liter separable flask equipped with a stirrer, a reflux condenser, a dropping funnel and a thermometer was charged with 100 g of Ricon 184 (from Cray Valley; number-average molecular weight, 17,000; in above formula (2), e=126, (f+g)=54, h=70), 200 g of toluene, a toluene solution of platinum-1,3-divinyl-1,1,3,3-tetramethyldisiloxane complex (amount in terms of platinum atoms, 3.1×10$^{-3}$ mole), and 0.2 g (3.1×10$^{-3}$ mole) of acetic acid. Next, 51 g (0.31 mole) of triethoxysilane was added dropwise over 2 hours at an internal temperature of 75 to 85° C., following which the system was stirred at 80° C. for 1 hour.

Following the completion of stirring, vacuum condensation and filtration were carried out, giving a clear brown liquid having a viscosity of 38,000 mPa·s and a number-average molecular weight of 25,000. The product, based on its molecular weight and the average structure as determined from the $^1$H-NMR spectrum, was an organosilicon compound of above formula (1) in which e=126, f=0, g=54 and h=70.

Working Example 1-9

A one-liter separable flask equipped with a stirrer, a reflux condenser, a dropping funnel and a thermometer was charged with 100 g of Ricon 184 (from Cray Valley; number-average molecular weight, 17,000; in above formula (2), e=126, (f+g)=54, h=70), 200 g of toluene, a toluene solution of platinum-1,3-divinyl-1,1,3,3-tetramethyldisiloxane complex (amount in terms of platinum atoms, 1.5×10$^{-3}$ mole), and 0.1 g (1.5×10$^{-3}$ mole) of acetic acid. Next, 25 g (0.15 mole) of triethoxysilane was added dropwise over 2 hours at an internal temperature of 75 to 85° C., following which the system was stirred at 80° C. for 1 hour.

Following the completion of stirring, vacuum condensation and filtration were carried out, giving a clear brown liquid having a viscosity of 45,000 mPa·s and a number-average molecular weight of 21,000. The product, based on its molecular weight and the average structure as determined from the $^1$H-NMR spectrum, was an organosilicon compound of above formula (1) in which e=126, f=27, g=27 and h=70.

Comparative Example 1-1

Referring to JP-A 2005-250603, an organosilicon compound was synthesized by the following method.

A one-liter separable flask equipped with a stirrer, a reflux condenser, a dropping funnel and a thermometer was charged with 100 g of R-45H (from Idemitsu Kosan Co., Ltd.; number-average molecular weight, 2,800), 18 g of KBE-9007 (Shin-Etsu Chemical Co., Ltd.; 3-isocyanatopropyltriethoxysilane) and 0.5 g of dioctyltin oxide catalyst (Tokyo Chemical Industry Co., Ltd.), and the flask contents were stirred at an internal temperature of 60° C. for 2 hours.

Following the completion of stirring, vacuum condensation and filtration were carried out, giving a clear brown liquid having a viscosity of 8,000 mPa·s and a number-average molecular weight of 3,300.

Comparative Example 1-2

Referring to JP-A S62-265301, an organosilicon compound was synthesized by the following method.

A one-liter separable flask equipped with a stirrer, a reflux condenser, a dropping funnel and a thermometer was charged with 100 g of B-1000 (Nippon Soda Co., Ltd.), 200 g of toluene and 129 g (0.8 mole) of 3-mercaptopropyltriethoxysilane, and the flask contents were stirred at an internal temperature of 100° C. for 4 hours.

Following the completion of stirring, vacuum condensation and filtration were carried out, giving a clear brown liquid having a viscosity of 5,000 mPa·s and a number-average molecular weight of 2,000.

Comparative Example 1-3

Referring to JP-A S62-265301, an organosilicon compound was synthesized by the following method.

A one-liter separable flask equipped with a stirrer, a reflux condenser, a dropping funnel and a thermometer was charged with 100 g of B-1000 (Nippon Soda Co., Ltd.), 200 g of toluene and 23 g (0.1 mole) of 3-mercaptopropyltriethoxysilane, and the flask contents were stirred at an internal temperature of 100° C. for 4 hours.

Following the completion of stirring, vacuum condensation and filtration were carried out, giving a clear brown liquid having a viscosity of 900 mPa·s and a number-average molecular weight of 1,600.

[2] Preparation of Rubber Compositions

Working Examples 2-1 to 2-3

A masterbatch was prepared by blending together, as shown in Table 2: 110 parts of the oil-extended emulsion polymer SBR (#1712, from JSR Corporation), 20 parts of NR (RSS #3 grade), 20 parts of carbon black (N234 grade), 50 parts of silica (Nipsil AQ, from Nippon Silica Industries), 6.5 parts of the organosilicon compound obtained in Working Example 1-2 or a combined amount of 6.5 parts of this organosilicon compound and KBE-846 (Shin-Etsu Chemical Co., Ltd.; bis(triethoxysilylpropyl)tetrasulfide), 1 part of stearic acid and 1 part of the antidegradant 6C (Nocrac 6C, from Ouchi Shinko Chemical Industry Co., Ltd.).

To this were added 3 parts of zinc white, 0.5 part of the vulcanization accelerator DM (dibenzothiazyl disulfide), 1 part of the vulcanization accelerator NS (N-t-butyl-2-benzothiazolyl sulfenamide) and 1.5 parts of sulfur, and kneading was carried out, giving a rubber composition.

Working Examples 2-4 to 2-8

Aside from changing, as shown in Table 2, the organosilicon compound obtained in Working Example 1-2 to the respective organosilicon compounds obtained in Working Examples 1-5 to 1-9, rubber compositions were obtained in the same way as in Working Example 2-3.

Comparative Examples 2-1 to 2-3

Aside from changing, as shown in Table 3, the organosilicon compound obtained in Working Example 1-2 to the respective organosilicon compounds obtained in Comparative Examples 1-1 to 1-3, rubber compositions were obtained in the same way as in Working Example 2-3.

Comparative Example 2-4

Aside from changing, as shown in Table 3, the organosilicon compound obtained in Working Example 1-2 to KBE-846, a rubber composition was obtained in the same way as in Working Example 2-1.

The properties of the rubber compositions obtained in Working Examples 2-1 to 2-8 and Comparative Examples 2-1 to 2-4, both in the unvulcanized form and the vulcanized form, were measured by the following methods. The results are shown in Tables 2 and 3.

[Properties of Unvulcanized Compositions]

(1) Mooney Viscosity

Measured in accordance with JIS K 6300 after allowing 1 minute for sample to reach thermal equilibrium with viscometer; measurement was carried out for 4 minutes at 130° C. The results are expressed as numbers relative to an arbitrary value of 100 for the result obtained in Comparative Example 2-4. A smaller number indicates a lower Mooney viscosity and thus a better processability.

[Properties of Vulcanized Compositions]

(2) Dynamic Viscoelasticity

Using a viscoelastic tester (Rheometrics), measurement was carried out at 5% dynamic strain under tension, a frequency of 15 Hz, and at 0° C. and 60° C. Using sheets having a thickness of 0.2 cm and a width of 0.5 cm as the test specimens, the clamping interval in the tester was set to 2 cm and the initial load was set to 160 g. The tan δ values are expressed as numbers relative to an arbitrary value of 100 for the result in Comparative Example 2-4. A larger value at 0° C. indicates a better wet grip performance. A smaller value at 60° C. indicates a smaller hysteresis loss and lower heat buildup.

(3) Wear Resistance

Testing was carried out in general accordance with JIS K 6264-2: 2005 using a Lambourn abrasion tester under the following conditions: room temperature, 25% slip ratio. The results are expressed as numbers relative to an arbitrary value of 100 for the result in Comparative Example 2-4. A larger number indicates a lower abrasion loss and a better wear resistance.

TABLE 2

| Formulation (pbw) | | Working Example | | | | | | | |
|---|---|---|---|---|---|---|---|---|---|
| | | 2-1 | 2-2 | 2-3 | 2-4 | 2-5 | 2-6 | 2-7 | 2-8 |
| SBR | | 110 | 110 | 110 | 110 | 110 | 110 | 110 | 110 |
| NR | | 20 | 20 | 20 | 20 | 20 | 20 | 20 | 20 |
| Carbon black | | 20 | 20 | 20 | 20 | 20 | 20 | 20 | 20 |
| Silica | | 50 | 50 | 50 | 50 | 50 | 50 | 50 | 50 |
| Organosilicon compound | Working Example 1-2 | 6.5 | 3.3 | 1.6 | — | — | — | — | — |
| | Working Example 1-5 | — | — | — | 1.6 | — | — | — | — |
| | Working Example 1-6 | — | — | — | — | 1.6 | — | — | — |
| | Working Example 1-7 | — | — | — | — | — | 1.6 | — | — |
| | Working Example 1-8 | — | — | — | — | — | — | 1.6 | — |
| | Working Example 1-9 | — | — | — | — | — | — | — | 1.6 |
| | KBE-846 | — | 3.2 | 4.9 | 4.9 | 4.9 | 4.9 | 4.9 | 4.9 |
| Stearic acid | | 1 | 1 | 1 | 1 | 1 | 1 | 1 | 1 |
| Antidegradant 6C | | 1 | 1 | 1 | 1 | 1 | 1 | 1 | 1 |
| Zinc white | | 3 | 3 | 3 | 3 | 3 | 3 | 3 | 3 |
| Vulcanization accelerator DM | | 0.5 | 0.5 | 0.5 | 0.5 | 0.5 | 0.5 | 0.5 | 0.5 |
| Vulcanization accelerator NS | | 1 | 1 | 1 | 1 | 1 | 1 | 1 | 1 |
| Sulfur | | 1.5 | 1.5 | 1.5 | 1.5 | 1.5 | 1.5 | 1.5 | 1.5 |
| [Properties of unvulcanized composition] | | | | | | | | | |
| Mooney viscosity | | 99 | 98 | 96 | 99 | 98 | 99 | 98 | 98 |
| [Properties of vulcanized composition] | | | | | | | | | |
| Dynamic viscoelasticity tan δ (0° C.) | | 100 | 106 | 106 | 112 | 108 | 103 | 105 | 108 |
| Dynamic viscoelasticity tan δ (60° C.) | | 98 | 85 | 83 | 88 | 93 | 97 | 93 | 93 |
| Wear resistance | | 100 | 104 | 105 | 105 | 105 | 104 | 103 | 103 |

TABLE 3

| Formulation (pbw) | | Comparative Example | | | |
|---|---|---|---|---|---|
| | | 2-1 | 2-2 | 2-3 | 2-4 |
| SBR | | 110 | 110 | 110 | 110 |
| NR | | 20 | 20 | 20 | 20 |
| Carbon black | | 20 | 20 | 20 | 20 |
| Silica | | 50 | 50 | 50 | 50 |
| Organosilicon compound | Comparative Example 1-1 | 1.6 | — | — | — |
| | Comparative Example 1-2 | — | 1.6 | — | — |
| | Comparative Example 1-3 | — | — | 1.6 | — |
| | KBE-846 | 4.9 | 4.9 | 4.9 | 6.5 |
| Stearic acid | | 1 | 1 | 1 | 1 |
| Antidegradant 6C | | 1 | 1 | 1 | 1 |
| Zinc white | | 3 | 3 | 3 | 3 |
| Vulcanization accelerator DM | | 0.5 | 0.5 | 0.5 | 0.5 |
| Vulcanization accelerator NS | | 1 | 1 | 1 | 1 |
| Sulfur | | 1.5 | 1.5 | 1.5 | 1.5 |
| [Properties of unvulcanized composition] | | | | | |
| Mooney viscosity | | 99 | 103 | 102 | 100 |
| [Properties of vulcanized composition] | | | | | |
| Dynamic viscoelasticity tan δ (0° C.) | | 100 | 101 | 99 | 100 |
| Dynamic viscoelasticity tan δ (60° C.) | | 103 | 105 | 109 | 100 |
| Wear resistance | | 85 | 89 | 87 | 100 |

It is apparent from Tables 2 and 3 that, compared with the rubber compositions of Comparative Examples 2-2 to 2-4, each of the rubber compositions of Working Examples 2-1 to 2-8 has a low Mooney viscosities and an excellent processability.

It is also apparent that, compared to the vulcanized rubber compositions of Comparative Examples 2-1 to 2-4, each of the vulcanized rubber compositions of Working Examples 2-1 to 2-8 has an excellent wet grip performance, a low heat buildup, and moreover an excellent wear resistance.

Working Examples 2-9 to 2-11

A masterbatch was prepared by blending together, as shown in Table 4: 100 parts of NR (RSS #3 grade), 38 parts of process oil, 5 parts of carbon black (N234 grade), 105 parts of silica (Nipsil AQ, from Nippon Silica Industries), 8.4 parts of the organosilicon compound obtained in Working Example 1-2 or a combined amount of 8.4 parts of this organosilicon compound and KBE-846 (Shin-Etsu Chemical Co., Ltd.; bis(triethoxysilylpropyl)tetrasulfide), 2 parts of stearic acid and 2 parts of the antidegradant 6C (Nocrac 6C, from Ouchi Shinko Chemical Industry Co., Ltd.).

To this were added 2 parts of zinc white, 3 parts of the vulcanization accelerator CZ (Nocceler CZ, from Ouchi Shinko Chemical Industry Co., Ltd.; N-cyclohexyl-2-benzothiazolyl sulfenamide) and 2 parts of sulfur, and kneading was carried out, giving a rubber composition.

Working Examples 2-12 to 2-16

Aside from changing, as shown in Table 4, the organosilicon compound obtained in Working Example 1-2 to the respective organosilicon compounds obtained in Working Examples 1-5 to 1-9, rubber compositions were obtained in the same way as in Working Example 2-11.

Comparative Examples 2-5 to 2-7

Aside from changing, as shown in Table 5, the organosilicon compound obtained in Working Example 1-2 to the respective organosilicon compounds obtained in Comparative Examples 1-1 to 1-3, rubber compositions were obtained in the same way as in Working Example 2-11.

Comparative Example 2-8

Aside from changing, as shown in Table 5, the organosilicon compound obtained in Working Example 1-2 to KBE-846, a rubber composition was obtained in the same way as in Working Example 2-9.

Next, the properties of the rubber composition when unvulcanized (Mooney viscosity) and when vulcanized (dynamic viscoelasticity, wear resistance) were measured in the same way as described above. The results, expressed as numbers relative to an arbitrary value of 100 for the result obtained in Comparative Example 2-8, are shown in Tables 4 and 5.

TABLE 4

| Formulation (pbw) | | Working Example | | | | | | | |
|---|---|---|---|---|---|---|---|---|---|
| | | 2-9 | 2-10 | 2-11 | 2-12 | 2-13 | 2-14 | 2-15 | 2-16 |
| NR | | 100 | 100 | 100 | 100 | 100 | 100 | 100 | 100 |
| Process oil | | 38 | 38 | 38 | 38 | 38 | 38 | 38 | 38 |
| Carbon black | | 5 | 5 | 5 | 5 | 5 | 5 | 5 | 5 |
| Silica | | 105 | 105 | 105 | 105 | 105 | 105 | 105 | 105 |
| Organosilicon compound | Working Example 1-2 | 8.4 | 4.2 | 2.1 | — | — | — | — | — |
| | Working Example 1-5 | — | — | — | 2.1 | — | — | — | — |
| | Working Example 1-6 | — | — | — | — | 2.1 | — | — | — |
| | Working Example 1-7 | — | — | — | — | — | 2.1 | — | — |
| | Working Example 1-8 | — | — | — | — | — | — | 2.1 | — |
| | Working Example 1-9 | — | — | — | — | — | — | — | 2.1 |
| | KBE-846 | — | 4.2 | 6.3 | 6.3 | 6.3 | 6.3 | 6.3 | 6.3 |
| Stearic acid | | 2 | 2 | 2 | 2 | 2 | 2 | 2 | 2 |
| Antidegradant 6C | | 2 | 2 | 2 | 2 | 2 | 2 | 2 | 2 |
| Zinc oxide | | 2 | 2 | 2 | 2 | 2 | 2 | 2 | 2 |
| Vulcanization accelerator CZ | | 3 | 3 | 3 | 3 | 3 | 3 | 3 | 3 |
| Sulfur | | 2 | 2 | 2 | 2 | 2 | 2 | 2 | 2 |
| [Properties of unvulcanized composition] | | | | | | | | | |
| Mooney viscosity | | 100 | 100 | 101 | 101 | 98 | 100 | 100 | 100 |
| [Properties of vulcanized composition] | | | | | | | | | |
| Dynamic viscoelasticity tan δ (60° C.) | | 98 | 96 | 96 | 97 | 96 | 99 | 96 | 96 |
| Wear resistance | | 110 | 111 | 109 | 108 | 108 | 102 | 107 | 106 |

TABLE 5

| Formulation (pbw) | Comparative Example | | | |
|---|---|---|---|---|
| | 2-5 | 2-6 | 2-7 | 2-8 |
| NR | 100 | 100 | 100 | 100 |
| Process oil | 38 | 38 | 38 | 38 |
| Carbon black | 5 | 5 | 5 | 5 |
| Silica | 105 | 105 | 105 | 105 |
| Organosilicon compound Comparative Example 1-1 | 2.1 | — | — | — |
| Comparative Example 1-2 | — | 2.1 | — | — |
| Comparative Example 1-3 | — | — | 2.1 | — |
| KBE-846 | 6.3 | 6.3 | 6.3 | 8.4 |
| Stearic acid | 2 | 2 | 2 | 2 |
| Antidegradant 6C | 2 | 2 | 2 | 2 |
| Zinc white | 2 | 2 | 2 | 2 |
| Vulcanization accelerator CZ | 3 | 3 | 3 | 3 |
| Sulfur | 2 | 2 | 2 | 2 |
| [Properties of unvulcanized composition] | | | | |
| Mooney viscosity | 101 | 102 | 105 | 100 |
| [Properties of vulcanized composition] | | | | |
| Dynamic viscoelasticity tan δ (60° C.) | 108 | 108 | 110 | 100 |
| Wear resistance | 90 | 87 | 90 | 100 |

It is apparent from Tables 4 and 5 that, compared with the vulcanized rubber compositions of Comparative Examples 2-5 to 2-8, each of the vulcanized rubber compositions of Working Examples 2-9 to 2-16 has a low dynamic viscoelasticity, i.e., the hysteresis loss is small and heat buildup is low, and moreover has an excellent wear resistance.

The invention claimed is:

1. A rubber compounding ingredient comprising an organosilicon compound having formula (1) having a number-average molecular weight of 10,500 to 40,000,

[Chem. 1]

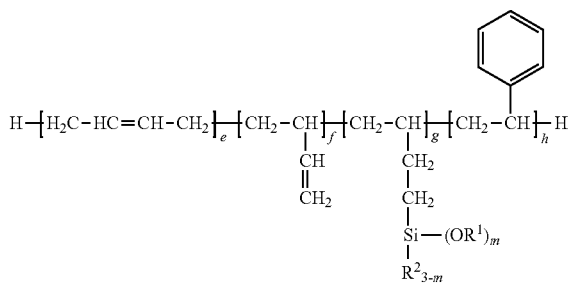

(1)

wherein each $R^1$ is independently an alkyl group of 1 to 10 carbon atoms or an aryl group of 6 to 10 carbon atoms, each $R^2$ is independently an alkyl group of 1 to 10 carbon atoms or an aryl group of 6 to 10 carbon atoms, f is a number of 0 or more, e, g and h are each independently a number larger than 0, and m is an integer from 1 to 3, with the proviso that individual recurring units are arranged in any order, and a sulfide group-containing organosilicon compound.

2. A method for producing an organosilicon compound having formula (1) having a number-average molecular weight of 10,500 to 40,000,

[Chem. 1]

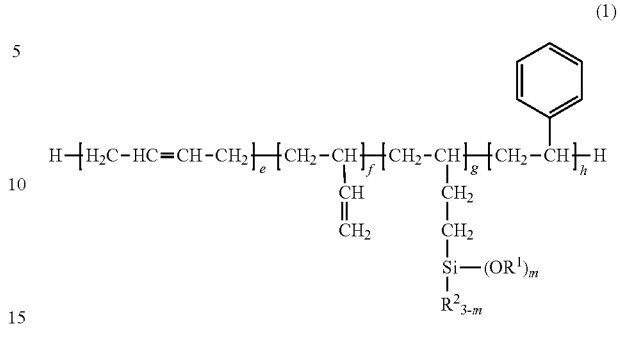

(1)

wherein each $R^1$ is independently an alkyl group of 1 to 10 carbon atoms or an aryl group of 6 to 10 carbon atoms, each $R^2$ is independently an alkyl group of 1 to 10 carbon atoms or an aryl group of 6 to 10 carbon atoms, f is a number of 0 or more, e, g and h are each independently a number larger than 0, and m is an integer from 1 to 3, with the proviso that individual recurring units are arranged in any order, comprising the step of carrying out hydrosilylation between a butadiene-styrene copolymer of formula (2)

[Chem. 2]

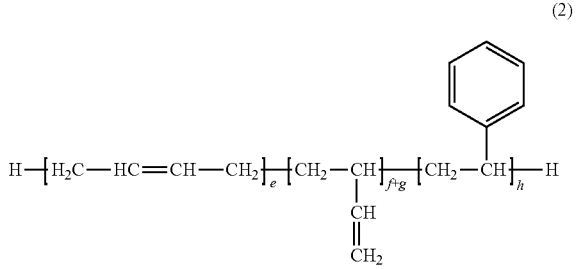

(2)

wherein e, f, g and h are as defined above, and an organosilicon compound of formula (3)

[Chem. 3]

(3)

wherein $R^1$, $R^2$ and m are as defined above, in the presence of a platinum compound-containing catalyst and an optional co-catalyst.

3. The organosilicon compound production method of claim 2, wherein the co-catalyst is an ammonium salt of an inorganic acid, an acid amide compound or a carboxylic acid.

4. The organosilicon compound production method of claim 3, wherein the ammonium salt of an inorganic acid is one or more selected from the group consisting of ammonium carbonate and ammonium bicarbonate.

5. The organosilicon compound production method of claim 3, wherein the acid amide compound is one or more selected from the group consisting of formamide, acetamide, N-methylacetamide, N,N-dimethylacetamide, propionamide, acrylamide, malonamide, succinamide, maleamide, fumaramide, benzamide, phthalamide, palmitamide and stearamide.

6. The organosilicon compound production method of claim 3, wherein the carboxylic acid is acetic acid.

7. The rubber compounding ingredient of claim 1 which further comprises at least one type of powder, wherein the weight ratio of the combined amount (A) of the organosilicon compound and the sulfide group-containing organosilicon compound with respect to the powder content (B) satisfies the condition (A)/(B)=70/30 to 5/95.

8. A rubber composition comprising the rubber compounding ingredient of claim 1.

9. A tire obtained by molding the rubber composition of claim 8.

\* \* \* \* \*